US007221940B2

(12) United States Patent
Kaneko et al.

(10) Patent No.: US 7,221,940 B2
(45) Date of Patent: May 22, 2007

(54) SERVER ON WIRELESS NETWORK COMMUNICATES WITH TERMINAL ON CELLULAR NETWORK

(75) Inventors: Tomoharu Kaneko, Yokohama (JP); Yoshikazu Ishii, Yokohama (JP); Tsutomu Kito, Yokohama (JP); Tomohiro Iwama, Yokohama (JP); Satoshi Uno, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/499,441

(22) PCT Filed: Aug. 22, 2003

(86) PCT No.: PCT/JP03/10611

§ 371 (c)(1),
(2), (4) Date: Jun. 21, 2004

(87) PCT Pub. No.: WO2004/019520

PCT Pub. Date: Mar. 4, 2004

(65) Prior Publication Data

US 2005/0221842 A1 Oct. 6, 2005

(30) Foreign Application Priority Data

Aug. 22, 2002 (JP) ............................. 2002-242390
Feb. 19, 2003 (JP) ............................. 2003-040831
Jun. 27, 2003 (JP) ............................. 2003-185494

(51) Int. Cl.
*H04Q 7/20* (2006.01)

(52) U.S. Cl. ............................... 455/435.1; 455/456.1; 455/517; 455/456.6

(58) Field of Classification Search ............. 455/456.1, 455/517, 528; 370/335; 709/229
See application file for complete search history.

(56) References Cited

U.S. PATENT DOCUMENTS 5,842,131 A * 11/1998 Yamane ................... 455/456.1
6,314,300 B1 * 11/2001 Nakashima et al. ........ 455/517

(Continued)

FOREIGN PATENT DOCUMENTS

JP  2001144815  5/2001

(Continued)

OTHER PUBLICATIONS

Wu et al., "MIRAI Architecture for Heterogeneous Network," IEEE Communications Magazine, Feb. 2002, p. 126-134.

(Continued)

*Primary Examiner*—Joseph Feild
*Assistant Examiner*—Phuoc Doan
(74) *Attorney, Agent, or Firm*—Stevens, Davis, Miller & Mosher, LLP

(57) ABSTRACT

In the present invention, a position managing server on a wireless network using a wireless system without a paging function requests paging of a mobile terminal to a terminal managing server on a cellular network using a cellular wireless system, the terminal managing server transmits a paging request to the mobile terminal using the cellular network, and the mobile terminal receives the paging request, connects a wireless channel with the wireless network, requests an assignment of position information to the wireless network to acquire, and notifies the position managing server on the wireless network of the position information acquired.

10 Claims, 13 Drawing Sheets

U.S. PATENT DOCUMENTS

2003/0039231 A1* 2/2003 Sinnarajah et al. ......... 370/335
2003/0145092 A1* 7/2003 Funato et al. ............... 709/229

FOREIGN PATENT DOCUMENTS

| | | |
|---|---|---|
| JP | 2001265681 | 9/2001 |
| JP | 2001313672 | 11/2001 |
| JP | 2003199171 | 7/2003 |
| JP | 2003229800 | 8/2003 |
| WO | 0122720 | 3/2001 |

OTHER PUBLICATIONS

ANSI/IEEE Std 802.11a, 1999 Edition, Part 11: Wireless Lan Medium Access Control (MAC) and Physical Layer (PHY) Specifications, High Speed Physical Layer in the 5 GHZ Band, pp. i-viii and 1-86.

International Search Report dated Dec. 9, 2003.

* cited by examiner

SERVER ON WIRELESS NETWORK COMMUNICATES WITH TERMINAL ON CELLULAR NETWORK

TECHNICAL FIELD

The present invention relates to a position managing server that manages a position of a mobile terminal on a wireless network using a wireless system without the paging function and a mobile communication system.

BACKGROUND ART

In recent years, public wireless LAN service has been performed in a wireless LAN system using a wireless system such as IEEE 802.11 (for example, ANSI/IEEE Std 802.11, 1999 Edition), and wireless Internet access environments have become widespread. In the communication service in such public wireless LAN service, a terminal principally accesses a server group existing on the Internet.

Meanwhile, as typified by IP telephone and push type service, Internet service has been implemented such that a server group accesses a terminal.

In the wireless LAN system, a mobile terminal only adopts a state that a wireless channel is always connected or a wireless channel is completely disconnected and a power supply of a wireless interface is turned off. However, connecting the wireless channel always results in power consumption. Accordingly, when a portable mobile terminal is applied as a terminal, the mobile terminal turns off the power supply of the wireless interface during a period of time communications are not performed constantly so as to extend the connection time. In other words, when a server group accesses such a mobile terminal, a communication channel of the mobile terminal is not connected unless the mobile terminal is communicating.

Further, when the communication channel of the mobile terminal is not connected, the server group cannot detect that the mobile terminal has moved, and therefore, cannot manage an IP address that is position information of the mobile terminal.

As described above, in the wireless access system using the wireless access system without the paging function, there is a problem that a server group cannot perform paging processing on a mobile terminal.

DISCLOSURE OF INVENTION

It is an object of the present invention to enable a session to be initiated even when a mobile terminal cannot establish a wireless link with a wireless network on the wireless network using a wireless access system without the paging function.

In the present invention, a position managing server on a wireless network using a wireless system without the paging function requests paging of a mobile terminal to a terminal managing server on a cellular network using a cellular wireless system provided with the paging function by intermittently receiving a paging channel, the terminal managing server issues a paging request to the mobile terminal using the cellular network, and the mobile terminal receives the paging request, connects a wireless channel with the wireless network, requests an assignment of position information to the wireless network to acquire, and notifies the acquired position information to the position managing server on the wireless network.

In this way, it is possible to initiate a session even when a mobile terminal cannot establish a wireless link with a wireless network on the wireless network using a wireless access system without the paging function.

BEST MODE FOR CARRYING OUT THE INVENTION

First Embodiment

A mobile communication system using a mobile communication method according to the first embodiment of the present invention will be described below with reference to accompanying drawings.

The mobile communication system is a system that integrates a plurality of wireless access systems including a cellular wireless system that is a wireless access system provided with the intermittent reception function. In this embodiment, as a principal wireless access system other than the cellular wireless system, described as an example is a wireless LAN system using IEEE 802.11. However, a wireless system is not limited particularly, and any other wireless access systems may be used as long as the access systems do not have the paging function and are used in broadband Internet access.

It is assumed in the first embodiment that the wireless LAN system is constructed of IP network as a base, and that a call such as an IP telephone call arrives at a mobile terminal in an inactive state.

Figure 1:
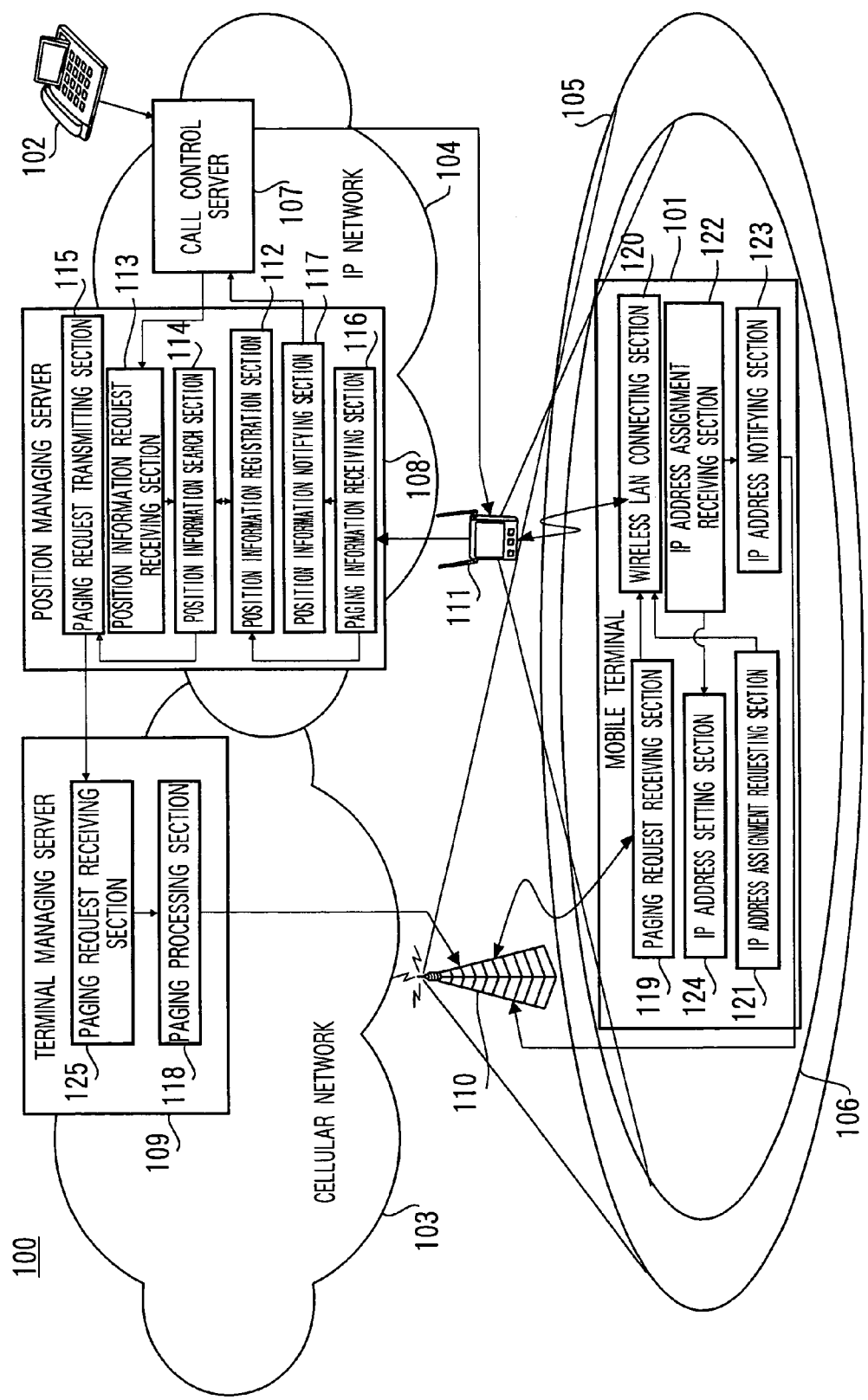
FIG. 1 is a configuration diagram of a mobile communication system according to a first embodiment of the present invention.

A configuration of the mobile communication system according to the first embodiment will be described below with reference to FIG. 1. FIG. 1 is a configuration diagram of the mobile communication system according to the first embodiment.

Mobile communication system 100 is an integrated system of cellular network 103 by cellular wireless system and IP network 104 by wireless LAN system using IEEE 802.11.

Cellular network 103 has cell 105 where communications are available by cellular wireless access via cellular network base station 110. IP network 104 has cell 106 where communications are available by wireless LAN access via wireless LAN access apparatus 111.

Mobile communication system 100 is further provided with wireless interfaces for both the cellular wireless system and wireless LAN, and has mobile terminal 101 capable of communicating with both cellular network 103 and IP network 104. A configuration of mobile terminal 101 will be described specifically later.

Mobile communication system 100 has paging call initiating terminal 102 that initiates a call to mobile terminal 101. When initiating a call to mobile terminal 101, the call initiating terminal 102 transmits a call request and a request to resolve an IP address of a connection destination based on a telephone number of the connection destination to call control server 107 on the IP network.

Call control server 107 is a server that implements call processing on IP network 104. When call control server 107 receives the call request and the request to resolve an IP address of a connection destination based on a telephone number of the connection destination, the server 107 transmits a position information request for inquiring about an IP address that is the position information of mobile terminal 101 at position managing server 108 on IP network 104.

Position managing server 108 is a server that manages the position information of mobile terminal 101 on IP network 104.

Position managing server 108 is provided with position information registration section 112 with which the IP address that is the position information of mobile terminal 101 is registered. With position information registration section 112 are registered IP addresses of terminals other than mobile terminal 101 that are active on IP network 104.

Position managing server 108 is further provided with position information request receiving section 113 that receives a request for transmission of the IP address that is the position information of mobile terminal 101 transmitted from call control server 107. When receiving the IP address transmission request, position information request receiving section 113 starts up position information search section 114 provided in position managing server 108.

When receiving information indicative of reception of the IP address transmission request, position information search section 114 checks whether the IP address of mobile terminal 101 is registered with position information registration section 112. When the IP address of mobile terminal 101 is not registered with position information registration section 112, position information search section 114 starts up paging request transmitting section 115 provided in position managing server 108.

Paging request transmitting section 115 transmits a paging request for paging mobile terminal 101 to terminal managing server 109 on cellular network 103.

Position managing server 108 is further provided with position information receiving section 116 that receives the IP address of mobile terminal 101 transmitted from mobile terminal 101. Position information receiving section 116 registers the received IP address of mobile terminal 101 with position information registration section 112. Further, position information receiving section 116 sends the received IP address of mobile terminal 101 to position information notifying section 117 provided in position information managing server 108.

Position information notifying section 117 notifies the sent IP address of mobile terminal 101 to call control server 107.

Terminal managing server 109 is provided with paging request receiving section 125 that receives the paging request transmitted from paging request transmitting section 105 of position managing server 108. When receiving the paging request, paging request receiving section 125 starts up paging processing section 118 provided in terminal managing server 109.

Paging processing section 118 transmits the paging request for activating mobile terminal 101 to mobile terminal 101 via cellular network base station 110. By this means, a wireless channel for paging is connected between terminal managing server 109 and mobile terminal 101.

Mobile terminal 101 is provided with paging request receiving section 119 that receives the paging request transmitted from paging processing section 118 of terminal managing server 109. When receiving the paging request, paging request receiving section 119 starts up wireless LAN connecting section 120 provided in mobile terminal 101.

Wireless LAN connecting section 120 transfers a state of mobile terminal 101 from the inactive state to the active state, and connects a wireless channel with IP network 104 that is the wireless LAN side of the mobile terminal 101.

Mobile terminal 101 is further provided with IP address assignment requesting section 121 that requests an assignment of an IP address to IP network 104. IP address assignment requesting section 121 receives the assignment of an IP address by using the function of DHCP (RFC 1541) or Stateless Address Autoconfiguration (RFC 2462).

Mobile terminal 101 is further provided with IP address assignment receiving section 122 that receives an IP address transmitted from IP network 104. IP address assignment receiving section 122 provides the received IP address to IP address notifying section 123 provided in mobile terminal 101.

IP address notifying section 123 transmits the assigned IP address to position managing section 108 via the wireless channel activated by wireless LAN connecting section 120, wireless LAN access apparatus 111 and IP network 104.

Mobile terminal 101 is further provided with IP address setting section 124 that sets the assigned IP address for the terminal 101.

Figure 2:
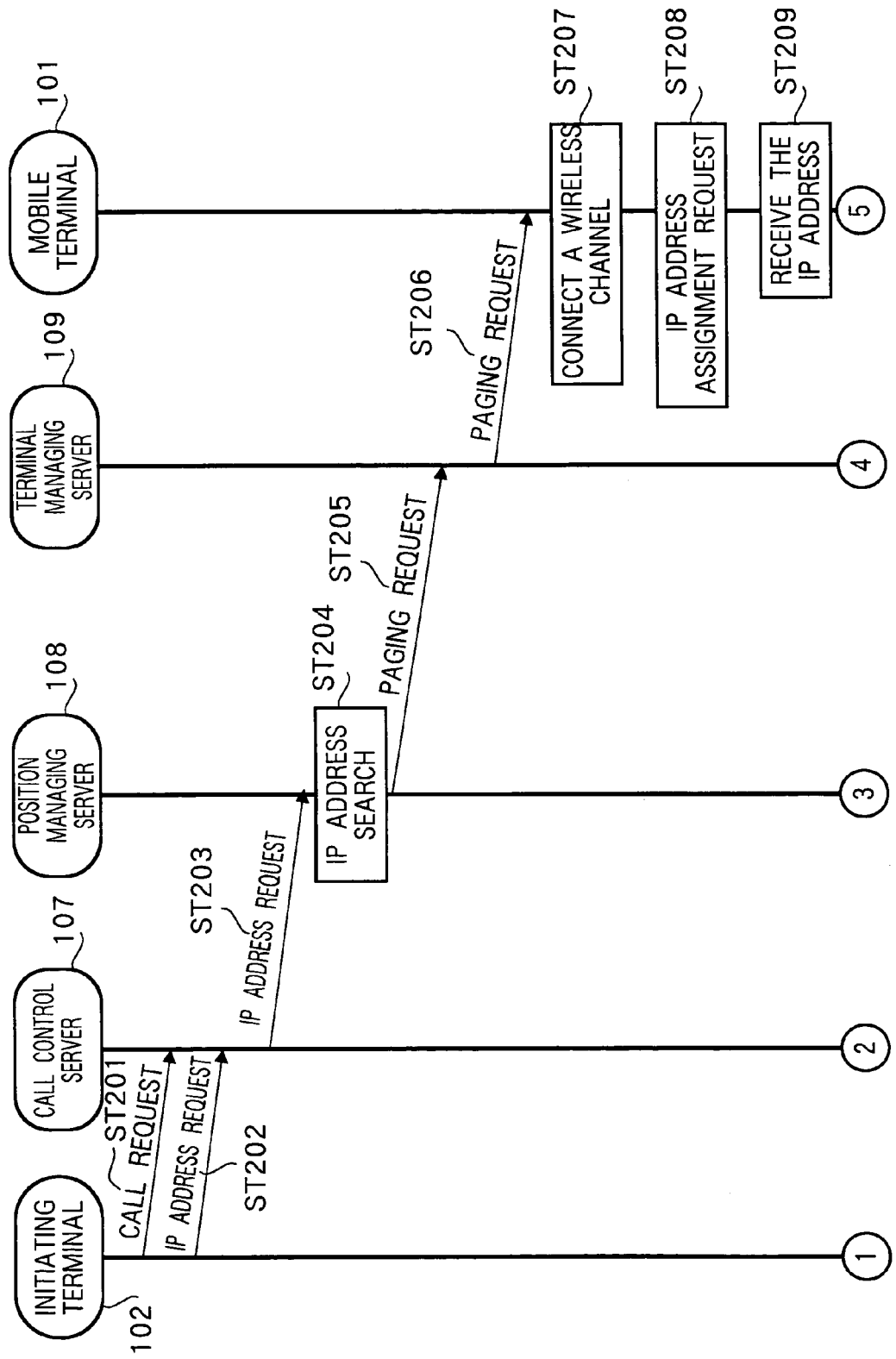
FIG. 2 is a first basic operation sequence diagram of the mobile communication system according to the first embodiment.
Figure 3:
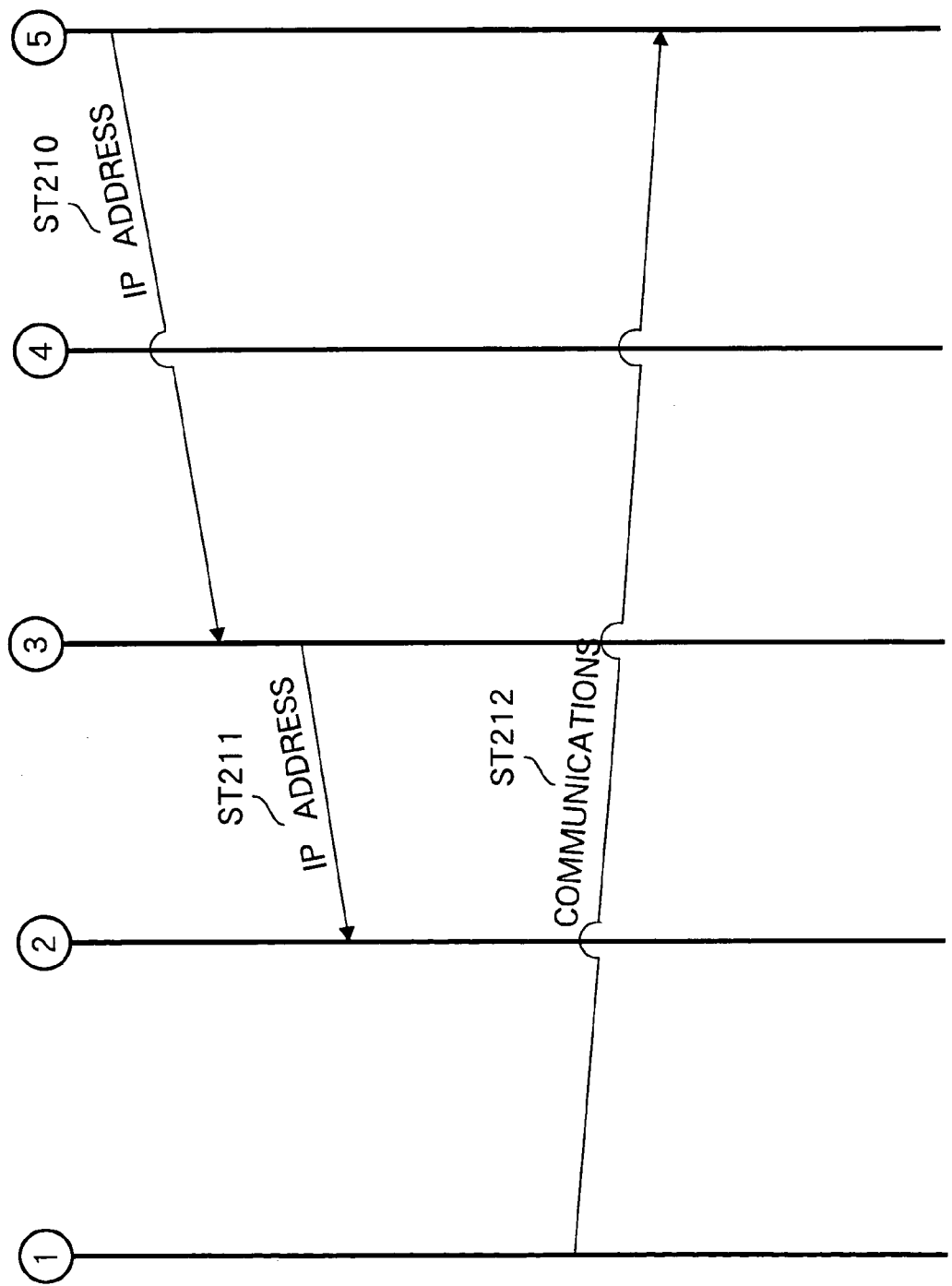
FIG. 3 is a second basic operation sequence diagram of the mobile communication system according to the first embodiment.

The basic operation of the mobile communication system according to the first embodiment will be described below with reference to FIGS. 2 and 3. FIGS. 2 and 3 are basic operation sequence diagrams of the mobile communication system according to the first embodiment.

When call initiating terminal 102 that is a paging initiator initiates a call to mobile terminal 101, the terminal 102 transmits a call request (ST201) and a request to resolve an IP address of a connection destination based on a telephone number of the connection destination (ST202) to call control server 107.

Call control server 107 transmits a position information request to position managing server 108 to inquire an IP address of mobile terminal 101 that is the connection destination of the call connection at position managing server 108 on IP network 104 (ST203).

In response thereto, position managing server 108 receives the position information request in position information request receiving section 113. Position information search section 114 in position managing server 108 searches position information registering section 112 for the IP address of mobile terminal 101 (ST204).

Since mobile terminal 101 is in an inactive state at this point, connection on wireless LAN is lost, and the IP address on IP network 104 is unknown. Therefore, it is necessary to activate (page) mobile terminal 101 to acquire the IP address of mobile terminal 101. However, position managing server 108 is present on IP network 104 that is the wireless LAN system without the paging function, and therefore, cannot activate mobile terminal 101. Hence, in the first embodiment, attention is drawn to cellular network 103 provided with the wireless access function having the intermittent reception function, and mobile terminal 101 is activated using cellular network 103. The processing for activating mobile terminal 101 will be described below.

Paging request transmitting section 115 in position managing server 108 transmits a paging request for mobile terminal 101 to terminal managing server 109 (ST205).

In response thereto, terminal managing server 109 receives in paging request receiving section 125 the paging request for mobile terminal 101 transmitted from position managing server 108.

Then, paging processing section 118 in position managing server 109 requests a paging request to mobile terminal 101 (ST206).

In response thereto, mobile terminal 101 receives the paging request in paging request receiving section 119. Wireless LAN connecting section 120 in mobile terminal 101 transfers a state of mobile terminal 101 from the inactive state to the active state, and connects the wireless channel with IP network 104 that is the wireless LAN side of the mobile terminal 101 (ST207).

Mobile terminal 101 is thus activated using cellular network 103.

Then, mobile terminal 101 shifts to processing for receiving an assignment of an IP address of the terminal 101 on the IP network.

IP address assignment requesting section 121 requests an assignment of an IP address to IP network 104 (ST208), and receives the assignment of an IP address by using the function of DHCP (RFC 1541) or Stateless Address Autoconfiguration (RFC 2462). Then, IP address assignment receiving section 122 in mobile terminal 101 receives the assigned IP address (ST209).

Thus, mobile terminal 101 receives the assignment of the IP address from IP network 104.

Next, IP address notifying section 123 in mobile terminal 101 notifies the IP address to position managing server 108 (ST210).

In response thereto, position managing server 108 receives the IP address of mobile terminal 101 in position information receiving section 116. Position information notifying section 117 in position managing server 108 notifies the IP address of mobile terminal 101 to call control server 107 (ST211).

In response thereto, call control server 107 receives the IP address of mobile terminal 101.

In this way, position managing server 108 and call control server 107 on IP network 104 resolve the IP address of mobile terminal 101 that is the connection destination, and therefore, communications are started between call initiating terminal 102 and mobile terminal 101 (ST212).

As described above, according to the first embodiment, paging mobile terminal 101 is implemented by using the paging function provided on the cellular network 103 side. Further, by activating mobile terminal 101, an IP address is assigned to mobile terminal 101, and the terminal 101 notifies the IP address to the IP network 104 side. As a result, on the IP network 104 side, it is possible to specify the IP address of mobile terminal 101 and implement paging mobile terminal 101 to start communications.

Further, by acquiring an IP address via IP network 104, position managing server 108 is capable of using an IP-based broadband network with high efficiency, and promptly and efficiently acquiring position information of mobile terminal 101 on the IP network 104 side.

In addition, it may be possible to prepare a program of the operation performed by each processing section in mobile terminal 101, position managing server 108 and terminal managing server 109 to store in a storage medium and make a general computer execute the program.

Second Embodiment

The second embodiment of the present invention describes imposing limitations on usage of the paging function of the cellular network side, based on information of a mobile terminal targeted for paging and call initiating terminal.

Figure 4:
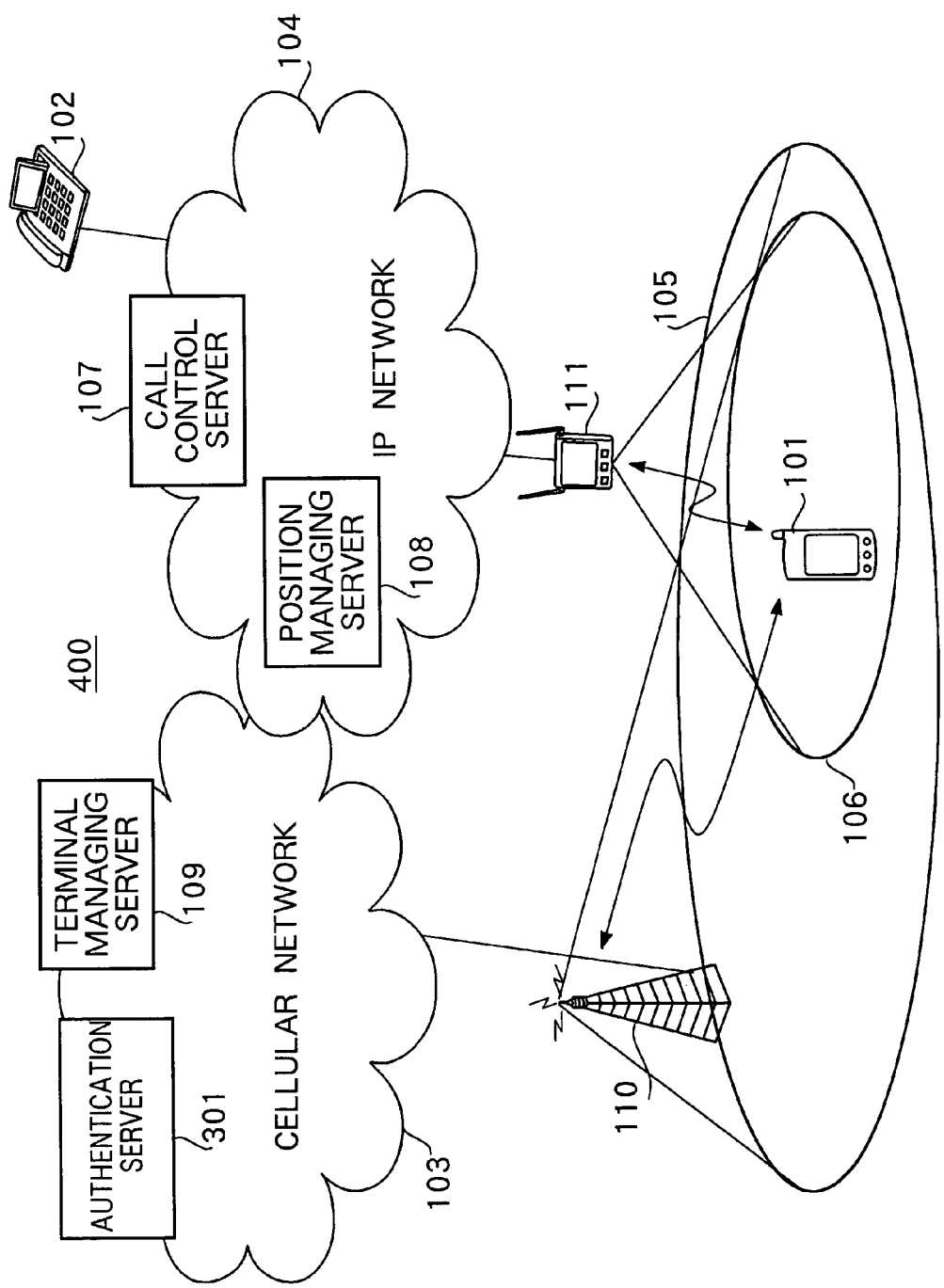
FIG. 4 is a configuration diagram of a mobile communication system according to a second embodiment of the present invention.

A configuration of the mobile communication system according to the second embodiment will be described below with reference to FIG. 4. FIG. 4 is a configuration diagram of the mobile communication system according to the second embodiment. In addition, the same sections as described earlier are assigned the same reference numerals to omit descriptions.

Mobile communication system 400 according to the second embodiment is provided with authentication server 301 on cellular network 103, and in this respect, different from mobile communication system 100 according to the first embodiment.

Authentication server 301 is a server that judges permission for a paging processing request from the IP network 104 side.

Figure 5:
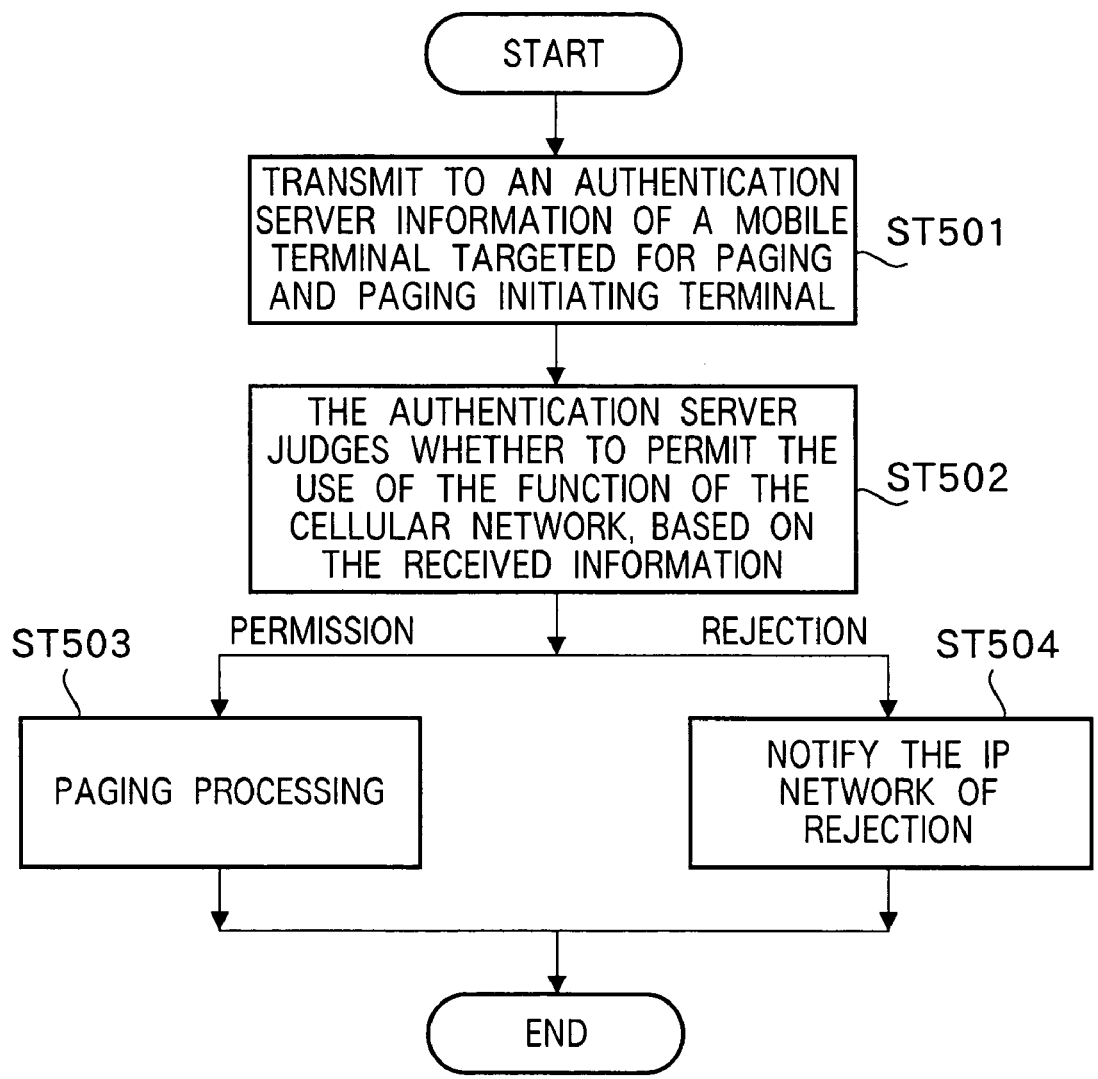
FIG. 5 is a flow diagram of paging processing permission processing in the mobile communication system according to the second embodiment.

The paging processing permission processing in the mobile communication system according to the second embodiment will be described below with reference to FIG. 5. FIG. 5 is a flow diagram of the paging processing permission processing in the mobile communication system according to the second embodiment.

Terminal managing server 109 on the cellular network side 103 transmits information of call initiating terminal 102 that is the paging initiator to authentication server 301, in response to a paging request from the position managing server 108 side on IP network 104 (ST501).

In response thereto, authentication server 301 judges whether or not to permit the use of the function of the cellular network 103 side using the information (ST502).

When authentication server 301 permits the use, paging processing section 118 continues the paging processing (ST503), while notifying reject to position managing server 108 on IP network 104 when the use is not permitted (ST504).

As described above, according to the second embodiment, it is possible to limit the function of paging a mobile terminal and the function of notifying the IP address, corresponding to profiles of the mobile terminal and call initiating terminal. By this means, for example, it is possible to provide the function as described only to a mobile terminal and/or call initiating terminal that contracts with an operator of cellular network 103. Further, it is possible to construct a system that integrates mobile communication systems run by different operators and implement sophisticated service for providing the function as described above corresponding to the content of a contract of a subscriber.

In addition, it may be possible to prepare a program of the operation performed by authentication server 301 to store in a storage medium and make a general computer execute the program.

Third Embodiment

The third embodiment describes notifying position information of a mobile terminal to the IP network side via the cellular network side.

Figure 6:
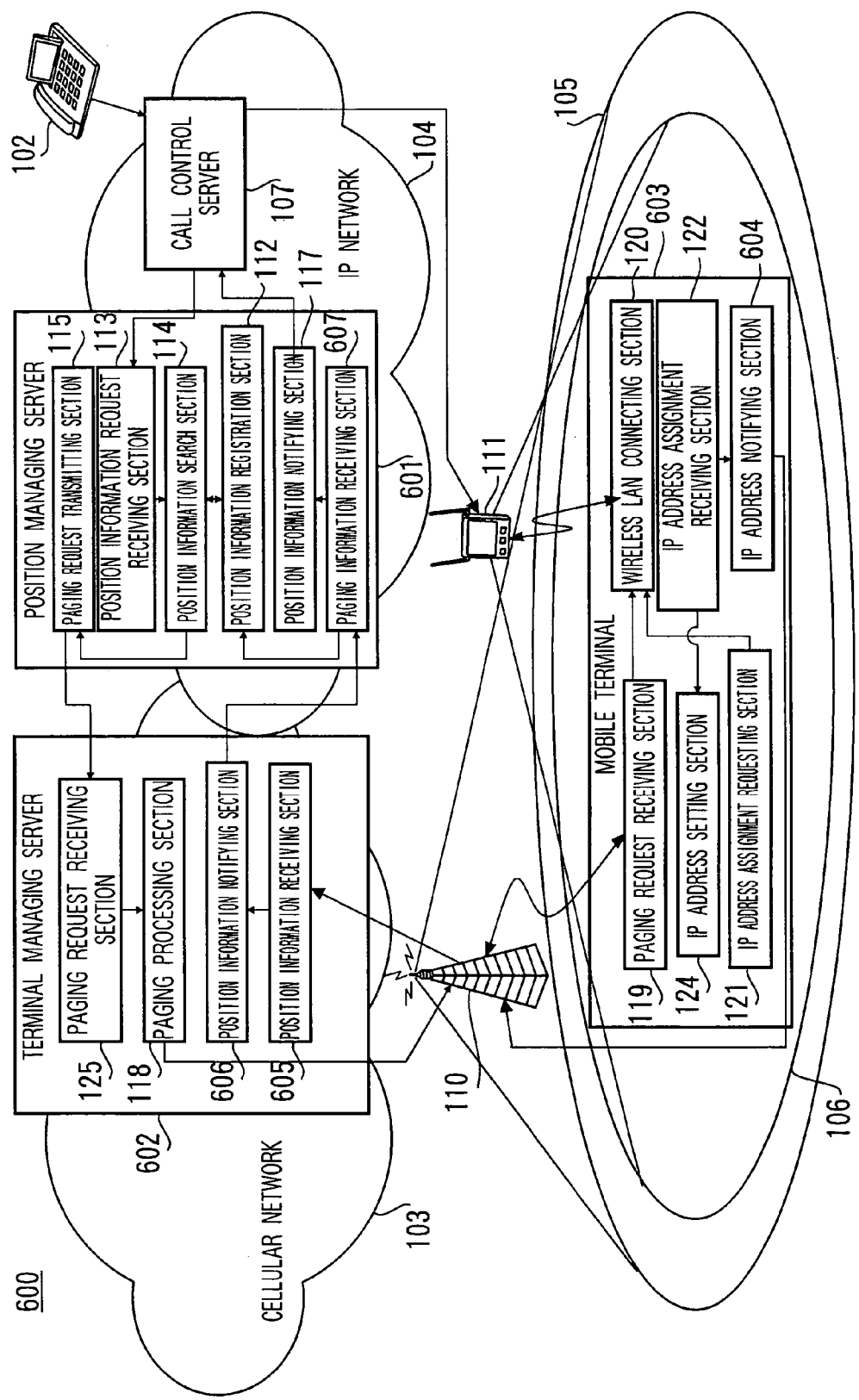
FIG. 6 is a configuration diagram of a mobile communication system according to a third embodiment of the present invention.

A configuration of the mobile communication system according to the third embodiment will be described below with reference to FIG. 6. FIG. 6 is a configuration diagram of the mobile communication system according to the third embodiment. In addition, the same sections as described earlier are assigned the same reference numerals to omit descriptions.

Mobile communication system 600 according to the third embodiment is provided with mobile terminal 603, position managing server 601 and terminal managing server 602 of which configurations are different from in the first embodiment.

Mobile terminal 603 is provided with IP address notifying section 604 that notifies an assigned IP address to terminal managing server 602 on cellular network 103.

Terminal managing server 602 is provided with paging request receiving section 125 and paging processing section 118.

Terminal managing server 602 is further provided with position information receiving section 605 that receives an IP address transmitted from mobile terminal 603. Position information receiving section 605 provides the received IP address to position information notifying section 606 provided in terminal managing server 602.

Position information notifying section 606 notifies the provided IP address to position managing server 601 on IP network 104.

Position managing server 601 is provided with position information receiving section 607 that acquires the IP address of mobile terminal 603 transmitted from terminal managing server 602. Position information receiving section 607 provides the received IP address to position information notifying section 117.

Figure 7:
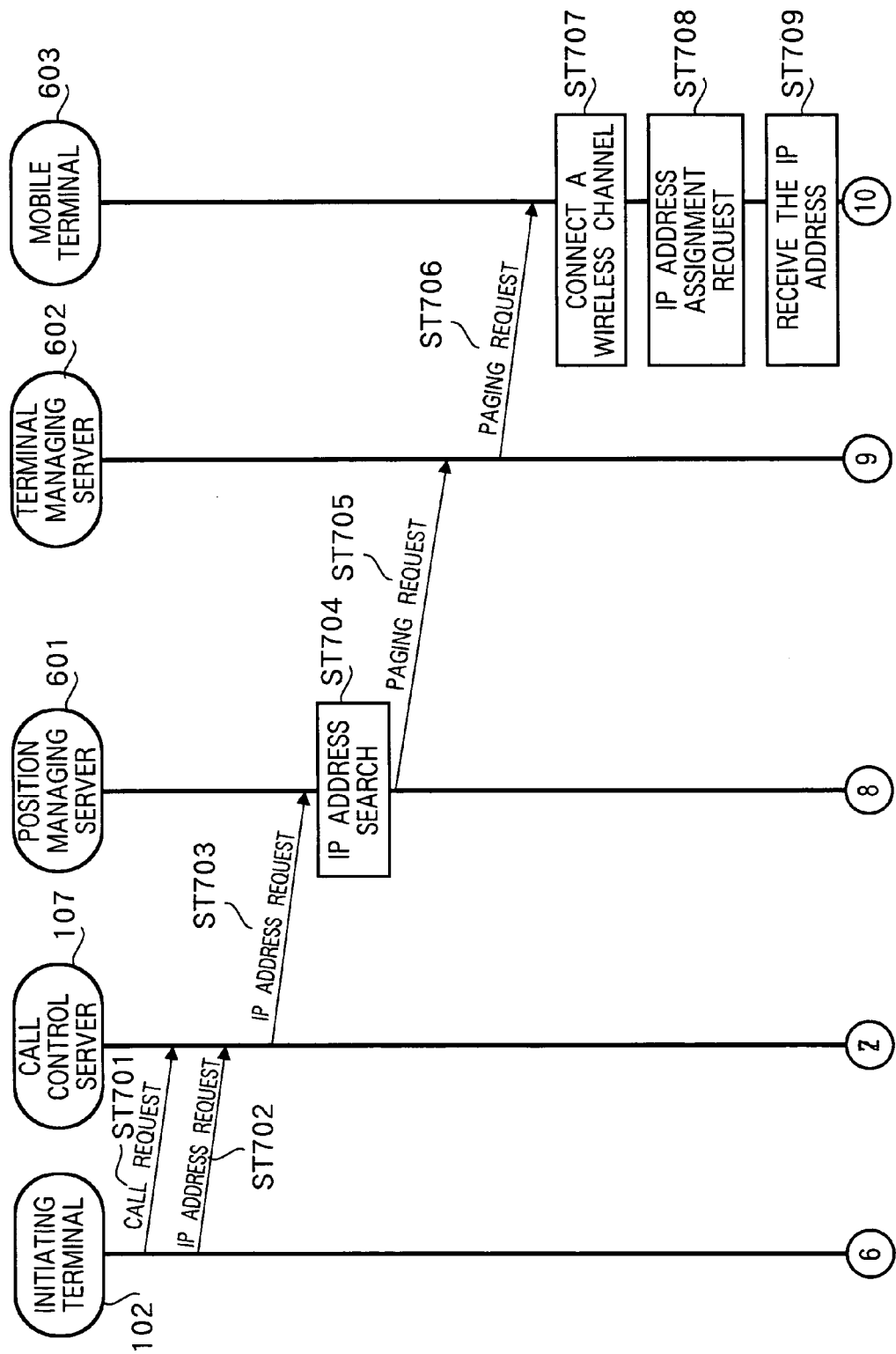
FIG. 7 is a first basic operation sequence diagram of the mobile communication system according to the third embodiment.
Figure 8:
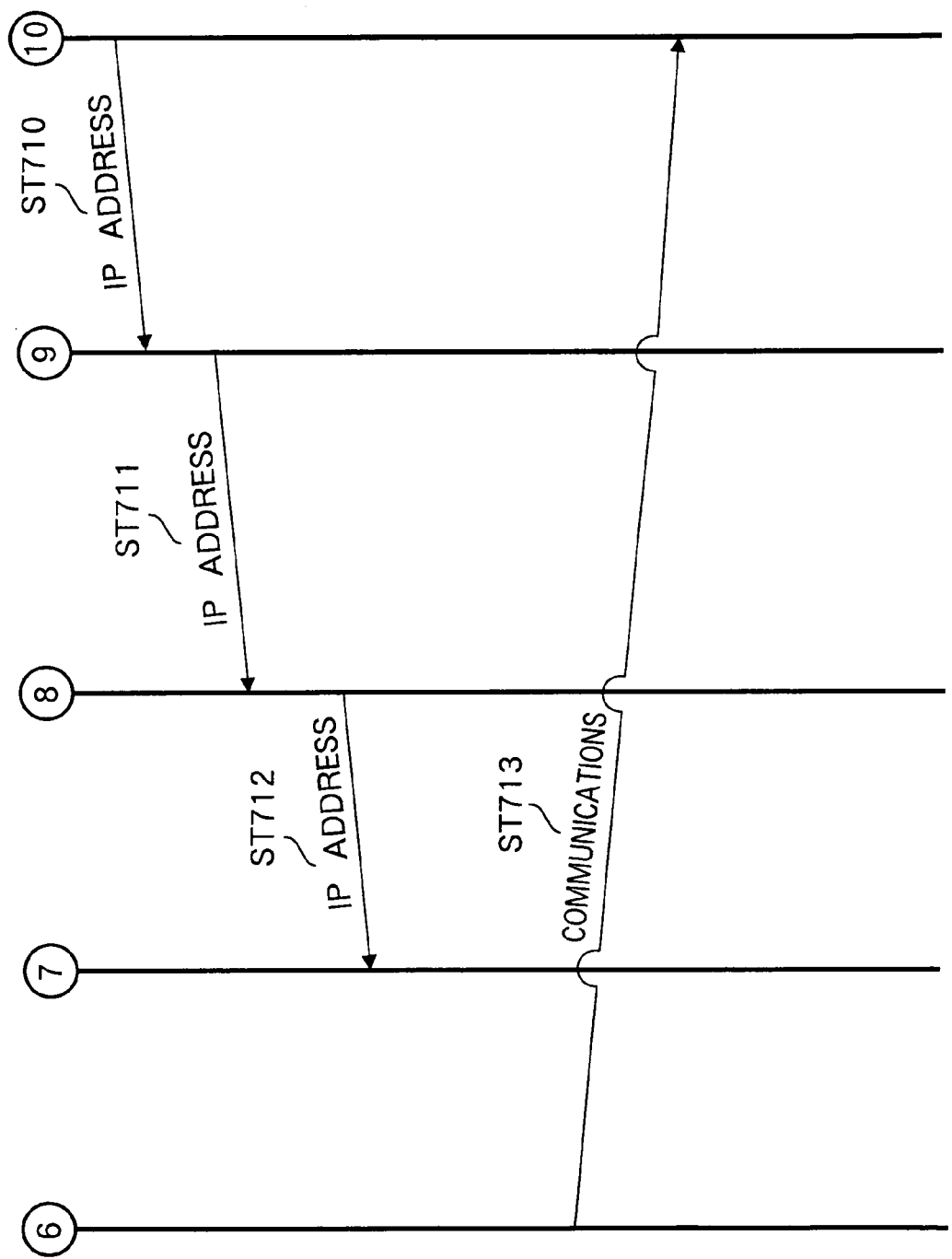
FIG. 8 is a second basic operation sequence diagram of the mobile communication system according to the third embodiment.

The basic operation of the mobile communication system according to the third embodiment will be described specifically below with reference to FIGS. 7 and 8. FIGS. 7 and 8 are basic operation sequence diagrams of the mobile communication system according to the third embodiment.

When call initiating terminal 102 initiates a call to mobile terminal 603, the terminal 102 transmits a call request (ST701) and a request to resolve an IP address of a connection destination based on a telephone number of the connection destination (ST702) to call control server 107.

Call control server 107 transmits a position information request to position managing server 601 to inquire an IP address of mobile terminal 603 that is the connection destination of the call connection at position managing server 601 on IP network 104 (ST703).

In response thereto, position managing server 601 receives the position information request in position information request receiving section 113. Position information search section 114 in position managing server 601 searches position information registration section 112 for the IP address of mobile terminal 101 (ST704).

Since mobile terminal 101 is in an inactive state at this point, connection on wireless LAN is lost, and the IP address on IP network 104 is unknown.

Therefore, paging request transmitting section 115 in position managing server 601 transmits a paging request for mobile terminal 603 to terminal managing server 602 (ST705).

In response thereto, terminal managing server 602 receives in paging request receiving section 125 the paging request for mobile terminal 603 transmitted from position managing server 601. Then, paging processing section 118 in terminal managing server 602 transmits a paging request to mobile terminal 603 (ST706).

In response thereto, mobile terminal 603 receives the paging request in paging request receiving section 119. Wireless LAN connecting section 120 in mobile terminal 603 transfers a state of mobile terminal 603 from the inactive state to the active state, and connects the wireless channel with IP network 104 that is the wireless LAN side of the mobile terminal 603 (ST707). Mobile terminal 603 is thus activated using cellular network 103.

IP address assignment requesting section 121 in mobile terminal 603 transmits a request for an assignment of an IP address to IP network 104 (ST708), and receives an assignment of the IP address (ST709).

Then, IP address notifying section 604 in mobile terminal 603 notifies the IP address to terminal managing server 602 (ST710).

In response thereto, position managing server 602 receives the transmitted IP address in position information receiving section 605, and provides the received IP address to position information notifying section 606 (ST711).

In response thereto, position managing server 601 receives the IP address of mobile terminal 603 in position information receiving section 607. Position information notifying section 117 in position managing server 601 notifies the IP address of mobile terminal 603 to call control server 107 (ST712).

In response thereto, call control server 107 receives the IP address of mobile terminal 603.

In this way, position managing server 601 and call control server 107 on the IP network 104 side resolve the IP address of mobile terminal 603 that is the connection destination, and therefore, communications are started between call initiating terminal 102 and mobile terminal 603 (ST713).

As described above, according to the third embodiment, the IP network 104 side is capable of acquiring an IP address of mobile terminal 603 via cellular network 103. By thus acquiring the IP address via cellular network 103, position managing server 601 is capable of securely acquiring position information of mobile terminal 603 on the IP network 104 side without being dependent on the network existing between the server 601 and mobile terminal 603 nor exposed to risks such as packet loss and information leak.

In addition, a path for the IP network to receive an IP address may be changed in a combination of the first and third embodiments corresponding to the state of communications between the cellular network and mobile terminal. In other words, when the state of communications between the cellular network and mobile terminal is not good, the IP network may receive the IP address directly from the mobile terminal.

Further, by applying the second embodiment to the third embodiment, the paging function for the mobile terminal and IP address notifying function may be limited corresponding to the profile of the mobile terminal and/or call initiating terminal.

In addition, it may be possible to prepare a program of the operation performed by each section in mobile terminal 603, position managing server 601 and terminal managing server 602 to store in a storage medium and make a general computer execute the program.

The present invention is not limited to the above-mentioned embodiments, and is capable of being carried into practice with various modifications thereof. For example, authentication server 301 may be disposed on the IP network 104 side that is a wireless network. Further, an IP address may be assigned by other method than the above-mentioned method.

Fourth Embodiment

Figure 9:
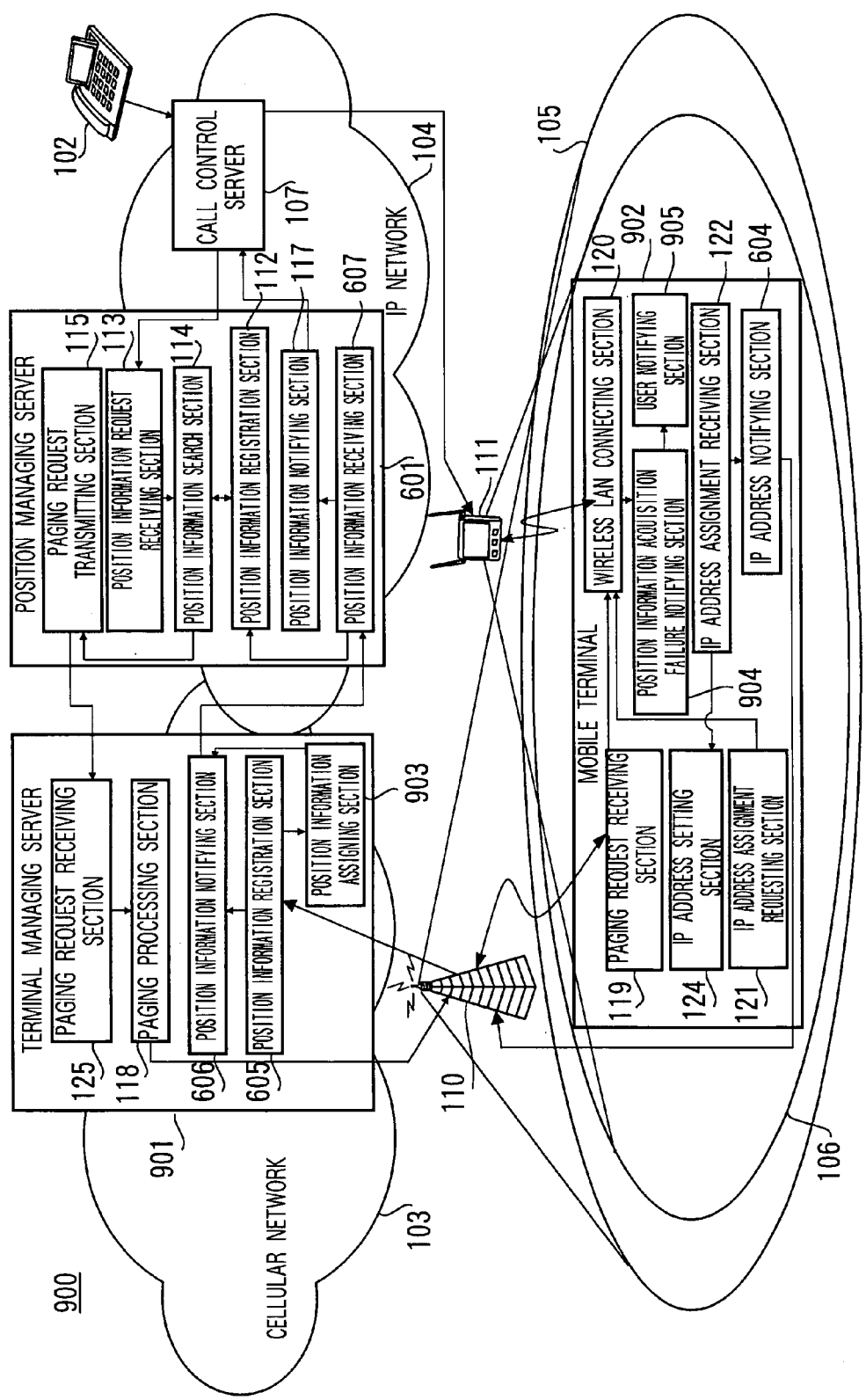
FIG. 9 is a configuration diagram of a mobile communication system according to a fourth embodiment of the present invention.

In the fourth embodiment, when acquisition of position information fails on the wireless LAN, position information on the cellular network is acquired as a substitute, and notified to the IP network side. A configuration of the mobile communication system according to the fourth embodiment will be described below with reference to FIG. 9. FIG. 9 is a configuration diagram of the mobile communication system according to the fourth embodiment. In addition, the same sections as described earlier are assigned the same reference numerals to omit descriptions.

Mobile communication system 900 according to the fourth embodiment is provided with terminal managing server 901 and mobile terminal 902 of which configurations are different from in the third embodiment.

Mobile terminal 902 is provided with position information acquisition failure notifying section 904. When mobile terminal 902 fails to acquire position information because, for example, the terminal 902 exists out of cell 106 where communications are available by wireless LAN access, position information acquisition failure notifying section 904 notifies terminal managing server 901 of failure of acquisition of the position information.

Mobile terminal 902 is further provided with user notifying section 905 that notifies that a paging request is received from cellular network 103 to a user when the paging request is received from cellular network 103 and acquisition of position information (IP address) on the wireless LAN fails.

By this means, the user of the mobile terminal is capable of recognizing that the terminal is currently present out of a range of the wireless network, and moving to inside the range of the wireless network when necessary.

Terminal managing server 901 is provided with position information assigning section 903 that assigns an IP address (cellular position information) on cellular network 103 to mobile terminal 902. Position information assigning section 903 is capable of virtually assigning an IP address usable on cellular network 103 using the function such as, for example, IPCP (RFC1332). Position information assigning section 903 handles the IP address as position information on cellular network 103.

In terminal managing server 901, when position information receiving section 605 receives the notification indicative of failure of acquisition of the position information, the section 605 requests an assignment of an IP address of mobile terminal 902 to position information assigning section 903. Position information assigning section 903 assigns an IP address to mobile terminal 902, and outputs the address to position information notifying section 606.

Figure 10:
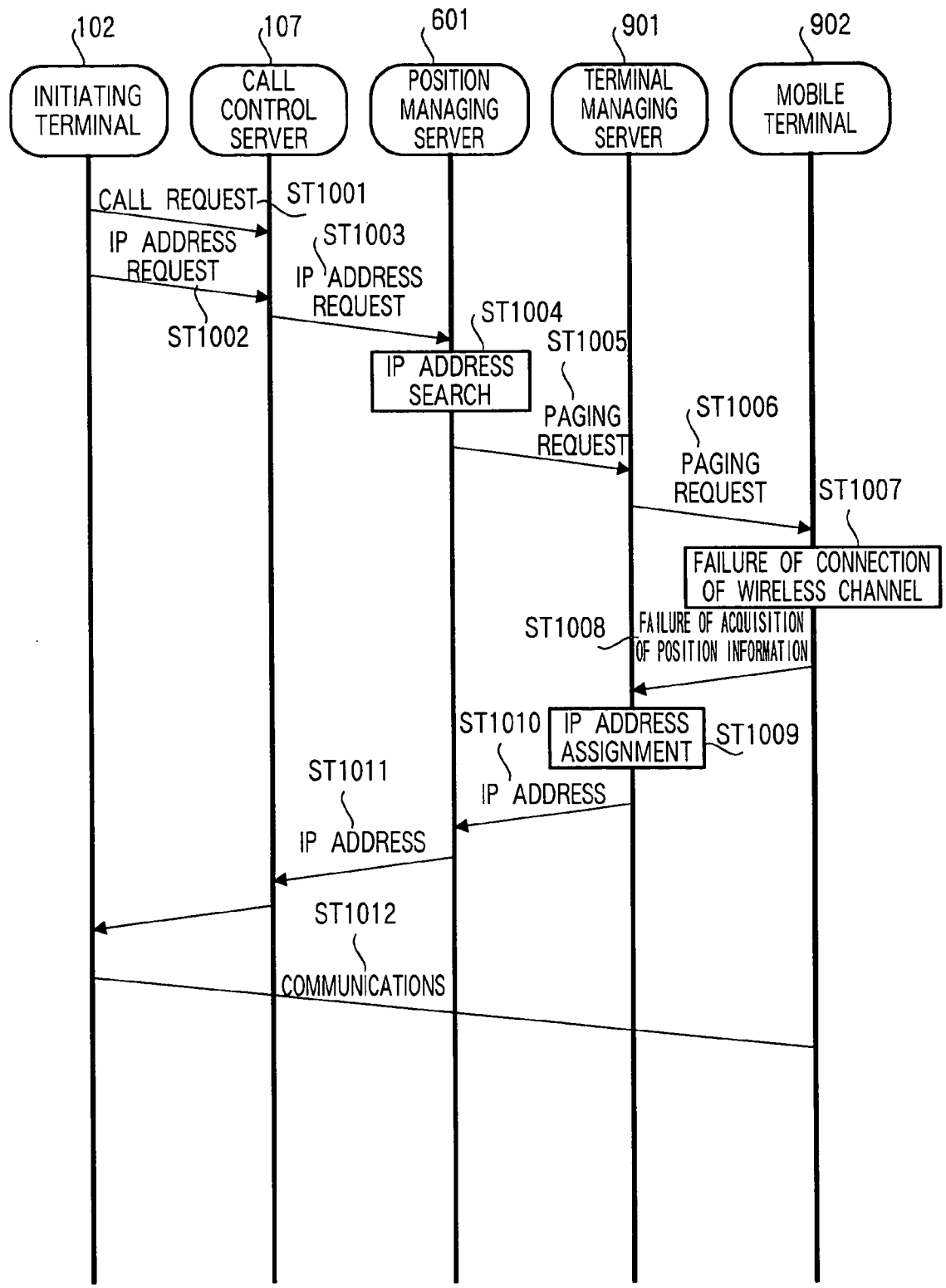
FIG. 10 is a basic operation sequence diagram of the mobile communication system according to the fourth embodiment.

The basic operation of the mobile communication system according to the fourth embodiment will be described specifically below with reference to FIG. 10. FIG. 10 is a basic operation sequence diagram of the mobile communication system according to the fourth embodiment.

When call initiating terminal 102 initiates a call to mobile terminal 902, the terminal 102 transmits a call request (ST1001) and a request to resolve an IP address of a connection destination based on a telephone number of the connection destination (ST1002) to call control server 107.

Call control server 107 transmits a position information request to position managing server 601 to inquire an IP address of mobile terminal 902 that is the connection destination of the call connection at position managing server 601 on IP network 104 (ST1003).

In response thereto, position managing server 601 receives the position information request in position information request receiving section 113. Position information search section 114 in position managing server 601 searches position information registration section 112 for the IP address of mobile terminal 902 (ST1004).

Since mobile terminal 902 is in an inactive state at this point, connection on wireless LAN is lost, and the IP address on IP network 104 is unknown.

Accordingly, paging request transmitting section 115 in position managing server 601 transmits a paging request for mobile terminal 902 to terminal managing server 901 (ST1005).

In response thereto, terminal managing server 901 receives in paging request receiving section 125 the paging request for mobile terminal 902 transmitted from position managing server 601. Then, paging processing section 118 in terminal managing server 901 transmits the paging request to mobile terminal 902 (ST1006).

In response thereto, mobile terminal 902 receives the paging request in paging request receiving section 119. Wireless LAN connecting section 120 in mobile terminal 902 transfers a state of mobile terminal 902 from the inactive state to the active state, and tries to connect the wireless channel.

At this point, in the fourth embodiment, mobile terminal 902 fails to connect the wireless channel for the reason that mobile terminal 902 exists out of the wireless LAN communication area, for example (ST1007). In addition, the same situation occurs when an IP address cannot be acquired due to a lack of resource on the wireless LAN side, for example.

Position information acquisition failure notifying section 904 notifies terminal managing server 901 of the failure of acquisition of the position information (ST1008).

In response thereto, in terminal managing server 901, when position information receiving section 605 receives the notification of position information acquisition failure, position information assigning section 903 assigns an IP address (cellular position information) on cellular network 103 to mobile terminal 902 (ST1009), and position information notifying section 606 notifies position managing server 601 of the assigned IP address on cellular network 103 (ST1010).

In response thereto, position managing server 601 receives the IP address of mobile terminal 902 on cellular network 103, in position information receiving section 607. Position information notifying section 117 in position managing server 601 notifies the IP address of mobile terminal 902 on cellular network 103 to call control server 107 (ST1011).

In response thereto, call control server 107 receives the IP address of mobile terminal 902 on cellular network 103.

In this way, position managing server 601 and call control server 107 on the IP network 104 side resolve the IP address on the cellular network 103 side of mobile terminal 902 that is the connection destination, and therefore, communications are started between call initiating terminal 102 and mobile terminal 902 via cellular network 103 (ST1012).

As described above, according to the fourth embodiment, it is possible to assign position information (IP address) on cellular network 103 to mobile terminal 902 and notify the position information to position managing server 601, even when mobile terminal 902 fails to connect a wireless channel with the wireless LAN and cannot acquire position information on the wireless LAN, for example, because mobile terminal 902 exists out of the wireless LAN communication area. It is thus possible to specify position information of mobile terminal 902 on cellular network 103 using an IP address on cellular network 103, even when communications are not performed using a wireless network. As a result, communications can be started between call initiating terminal 102 and mobile terminal 902 via cellular network 103.

In addition, in steps of ST1008 to ST1009 after mobile terminal 902 fails to acquire position information, IP address assignment requesting section 121 in mobile terminal 902 may request an assignment to cellular network 103 to acquire an IP address, and notify the address to terminal managing server 901.

Fifth Embodiment

A mobile communication system using a mobile communication method according to the fifth embodiment of the present invention will be described below with reference to accompanying drawings.

The mobile communication system is a system that integrates a plurality of wireless access systems including a cellular wireless system that is a wireless access system provided with the intermittent reception function. In this embodiment, as a principal wireless access system other than the cellular wireless system, described as an example is a wireless LAN system using IEEE 802.11. However, a wireless system is not limited particularly, and any other wireless access systems may be used as long as the access systems do not have the paging function and are used in broadband Internet access.

It is assumed in the fifth embodiment that the wireless LAN system is constructed of IP network as a base, and that a call such as an IP telephone call arrives at a mobile terminal in an inactive state.

Further, the fifth embodiment assumes a call control server that applies SIP as a call control scheme. However, the call control scheme may be another IP-based call control scheme such as H.323 which requires a call control server and allows exchange of communication capabilities.

Figure 11:
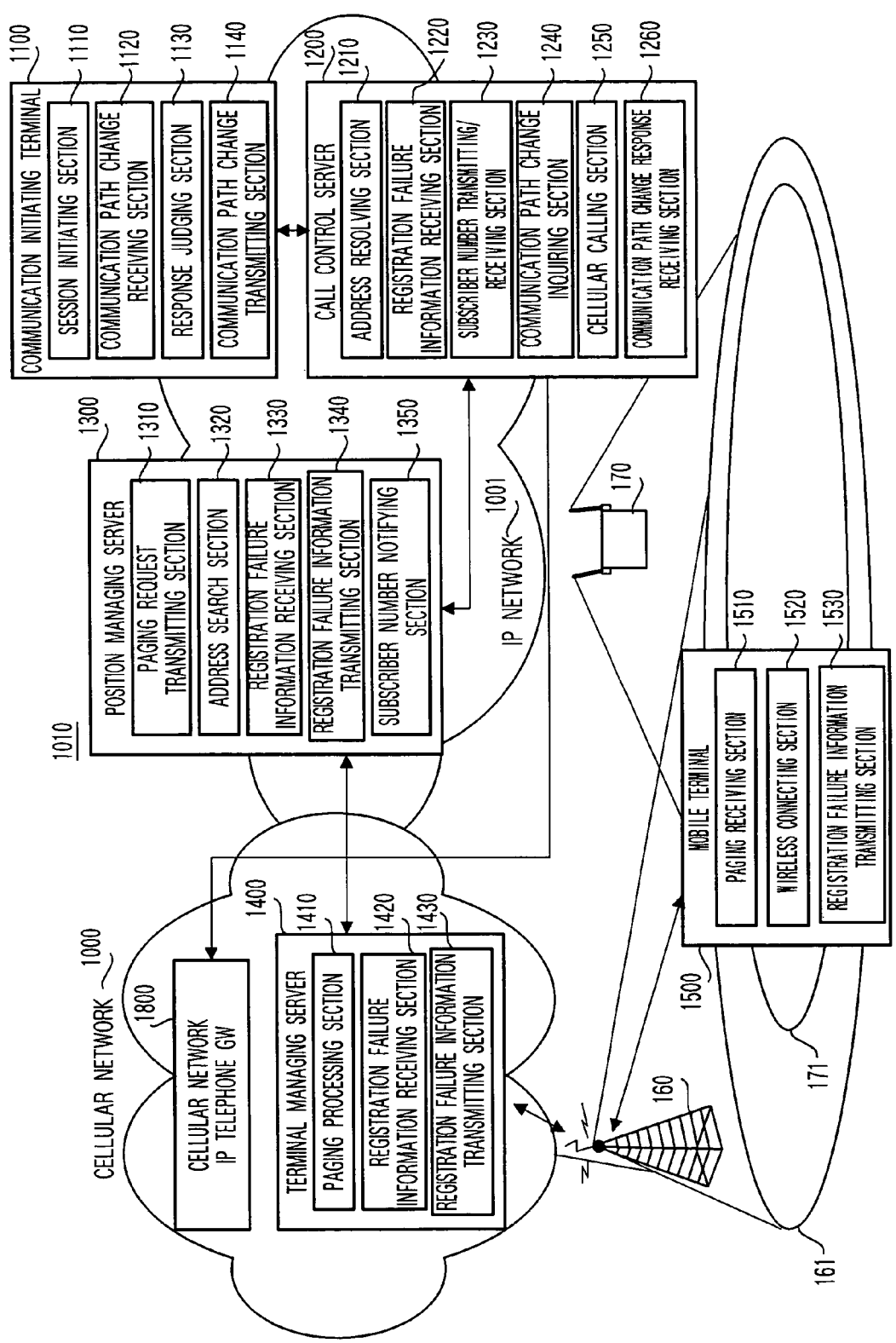
FIG. 11 is a block diagram of the mobile communication system according to a fifth embodiment of the present invention.

A configuration of the mobile communication system according to the fifth embodiment will be described below with reference to FIG. 11. FIG. 11 is a block diagram illustrating a configuration of the mobile communication system according to the fifth embodiment. In FIG. 11, arrows indicate transmission and/or reception of information data between apparatuses.

Mobile communication system 1010 is an integrated system of cellular network 1000 by cellular wireless system and IP network 1001 that is a wireless network by wireless LAN system using IEEE 802.11.

Cellular network 1000 has cell 161 where communications are available by cellular wireless access via cellular network base station 160.

IP network 1001 has cell 171 where communications are available by wireless LAN access via wireless network access point 170.

Mobile communication system 1010 is further provided with wireless interfaces for both the cellular wireless network and wireless LAN system, and has mobile terminal 1500 capable of communicating with both cellular network 1000 and IP network 1001.

IP network 1001 will be described specifically below.

IP network 1001 has communication initiating terminal 1100 as a call initiator that initiates a call to mobile terminal 1500.

Communication initiating terminal 1100 is provided with session initiating section 1110, communication path change receiving section 1120, response judging section 1130, and communication path change transmitting section 1140.

When initiating a call to mobile terminal 1500, communication initiating section 1100 starts up session initiating section 1110, and transmits a call request with SIP-URI of a communicating party designated to call control server 1200 on IP network 1001.

When receiving an inquiry about a change of communication path from call control server 1200, communication initiating terminal 1100 starts up communication path change receiving section 1120 and receives the inquiry about a change of communication path. Then, response judging section 1130 is activated and judges whether or not to accept the change of communication path. Communication path change transmitting section 1140 notifies call control server 1200 of the result judged in response judging section 1130.

Call control server 1200 is a server that implements call processing on IP network 1001.

When receiving a call request with SIP-URI of a communicating party designated from communication initiating terminal 1100, call control server 1200 starts up address resolving section 1210 to transmit an address resolving request to inquire an IP address that is position information of mobile terminal 1500 at position managing server 1300 on IP network 1001.

When registration failure information is transmitted from position managing server 1300, call control server 1200 starts up registration failure information receiving section 1220.

Subscriber number transmitting/receiving section 1230 acquires a cellular subscriber number of mobile terminal 1500 from position managing server 1300.

When receiving the registration failure information, call control server 1200 starts up communication path change inquiring section 1240 to inquire about a change of communication path at communication initiating terminal 1100.

Further, when call control server 1200 receives a response to the inquiry about a change of communication path transmitted from communication path change transmitting section 1140 of communication initiating terminal 1100, the server 1200 starts up communication path change response receiving section 1260. When the response to the inquiry about the change of communication path indicates permission to change the communication path to cellular network 1000, cellular calling section 1250 places a call to a cellular subscriber number of mobile terminal 1500.

Position managing server 1300 is a server that manages position information of mobile terminal 1500 on IP network 1001.

With position managing server 1300 is registered an IP address that is position information of mobile terminal 1500. With position managing server 1300 are further registered IP address of mobile terminals other than mobile terminal 1500 that are activated on IP network 1001.

Upon receiving a resolving request for an IP address that is position information of mobile terminal 1500 transmitted from call control server 1200, position managing server 1300 starts up address search section 1320 to check whether the IP address of mobile terminal 1500 is registered. When the IP address is not registered, position managing server 1300 starts up paging request transmitting section 1310.

Paging request transmitting section 1310 transmits a paging request for paging mobile terminal 1500 to terminal managing server 1400 on cellular network 1000.

Position managing server 1300 is further provided with registration failure information receiving section 1330 that receives registration failure information transmitted from mobile terminal 1500, and registration failure information transmitting section 1340 that notifies the registration failure information to call control server 1200.

Position managing server 1300 is further provided with subscriber number notifying section 1350 that notifies call control server 1200 of a cellular subscriber number of mobile terminal 1500.

Cellular network 1000 will be described specifically below.

Cellular network 1000 is provided with terminal managing server 1400 and cellular network IP telephone gateway 1800.

Terminal managing server 1400 is provided with paging processing section 1410 that receives a paging request transmitted from paging request transmitting section 1310 in position managing server 1300. Upon receiving the paging request, paging processing section 1410 transmits the paging request for activating mobile terminal 1500 to mobile terminal 1500 via cellular network base station 160. By this means, a paging wireless channel is connected between terminal managing server 1400 and mobile terminal 1500.

Terminal managing server 1400 is further provided with registration failure information receiving section 1420 that receives registration failure information transmitted from mobile terminal 1500, and registration failure information transmitting section 1430 that notifies the registration failure information to call control server 1200.

When a session is established by paging connection between call control server 1200 and call control server 1200 on cellular network 1000, cellular network IP telephone gateway 1800 enables communication initiating terminal 1100 and mobile terminal 1500 to mutually communicate.

Mobile terminal 1500 will be described specifically below.

Mobile terminal 1500 is provided with paging receiving section 1510 that receives a paging request transmitted from terminal managing server 1400. Upon receiving a paging request, paging receiving section 1510 starts up wireless connecting section 1520 provided in mobile terminal 1500.

Wireless connecting section 1520 transfers a state of mobile terminal 1500 from the inactive state to the active state, and connects a wireless channel between mobile terminal 1500 and IP network 1001.

Mobile terminal 1500 is further provided with registration failure information transmitting section 1530. When wireless connecting section 1520 in mobile terminal 1500 cannot establish a wireless link with IP network 1001, registration failure information transmitting section 1530 transmits registration failure information to terminal managing server 1400.

Figure 12:
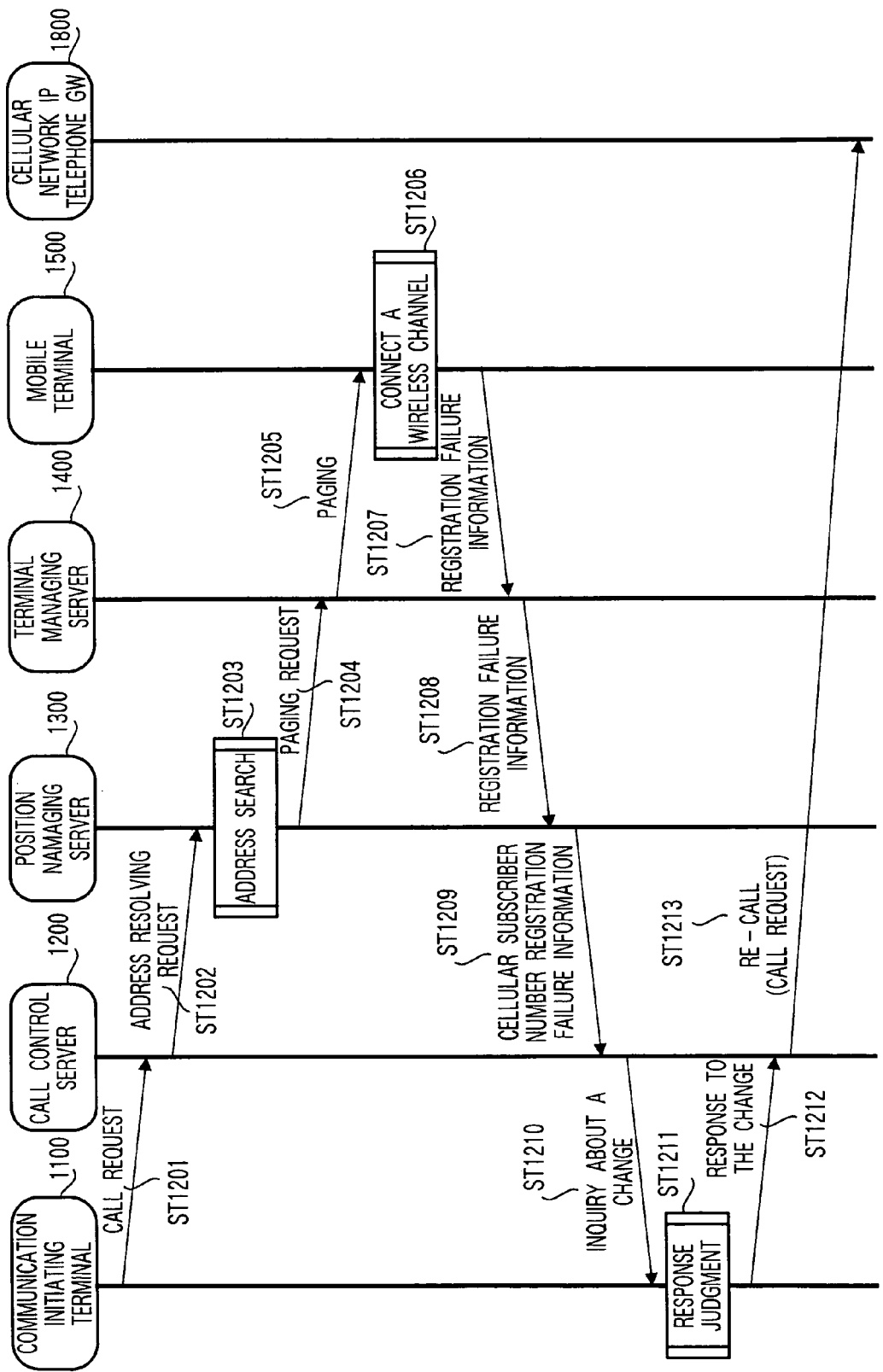
FIG. 12 is an operation sequence diagram of the mobile communication system according to the fifth embodiment.

The basic operation of the mobile communication system according to this embodiment will be described specifically below with reference to FIG. 12. FIG. 12 is an operation sequence diagram of the mobile communication system according to this embodiment, when mobile terminal 1500 exists out of the communication area of IP network 1001.

To initiate a call to mobile terminal 1500, session initiating section 1110 in communication initiating terminal 1100 on IP network 1001 transmits a call request with SIP-URI of mobile terminal 1500 designated to call control server 1200 (step 1201).

Address resolving section 1210 in call control server 1200 transmits an address resolving request to position managing server 1300 to inquire an IP address of mobile terminal 1500 that is a connection destination of the call connection at position managing server 1300 on IP network 1001 (step 1202).

In response thereto, address search section 1320 in position managing server 1300 searches an address database of the section 1320 to check whether the IP address of mobile terminal 1500 to resolve is registered with the database (step 1203).

At this point, address search section 1320 acquires the IP address and cellular subscriber number associated with SIP-URI described in the address resolving request.

In addition, address search section 1320 associates the SIP-URI, IP address and cellular subscriber number of mobile terminal 1500 with one another to register therewith. The IP address of the address database in address search section 1320 is periodically updated by binding update from mobile terminal 1500. When the IP address is not updated after a lapse of predetermined time, the IP address is discarded and becomes a non-registered state.

Further, the address database of address search section 1320 holds not only the address information of mobile terminal 1500 but also address information of other mobile terminals similarly.

At this point, since mobile terminal is in an inactive state, connection with IP network 1001 is lost, and an IP address on IP network 1001 is unknown and not registered with the address database in address search section 1320.

Therefore, it is necessary to page mobile terminal 1500 to acquire an IP address of mobile terminal 1500.

However, position managing server 1300 is on IP network 1001 that is the wireless LAN system without the paging function, and therefore, cannot page mobile terminal 1500. Then, in the fifth embodiment, mobile terminal 1500 is activated using cellular network 1000 applying wireless access provided with the intermittent reception function.

Paging request transmitting section 1310 in position managing server 1300 transmits a paging request for mobile terminal 1500 to terminal managing server 1400 on cellular network 1000 (step 1204).

In response thereto, in terminal managing server 1400, paging processing section 1410 receives the paging request for mobile terminal 1500 transmitted from position managing server 1300 and pages mobile terminal 1500 (step 1205).

Mobile terminal 1500 receives the paging request in paging receiving section 1510. Wireless connecting section 1520 in mobile terminal 1500 transfers a state of mobile terminal 1500 from the inactive state to the active state, and tries to connect a wireless channel with wireless access point 170 on IP network 1001 (step 1206).

However, when wireless connecting section 1520 cannot establish a wireless link with either wireless network access point 170 on IP network 1001, wireless connecting section 1520 starts up registration failure information transmitting section 1530.

In addition, as the reason for wireless connecting section 1520 not to establish a wireless link, it is considered that mobile terminal 1500 cannot acquire a wireless resource because of a large traffic amount flowing through IP network 1001, and that mobile terminal 1500 exists out of the communication area of IP network 1001.

Registration failure information transmitting section 1530 in mobile terminal 1500 notifies the failure of position registration with IP network 1001 to registration failure information receiving section 1420 in terminal managing server 1400 on cellular network 1000 (step 1207).

In response thereto, registration failure information receiving section 1420 in terminal managing server 1400 starts up registration failure information transmitting section 1430. Registration failure information transmitting section 1430 in terminal managing server 1400 transmits the registration failure information from mobile terminal 1500 to registration failure information receiving section 1330 in position managing server 1300 on IP network 1001 (step 1208).

In response thereto, registration failure information receiving section 1330 in position managing server 1300 starts up registration failure information transmitting section 1340.

Registration failure information transmitting section 1340 in position managing server 1300 transmits the registration failure information from terminal managing server 1400 to registration failure information receiving section 1220 in call control server 1200. At this point, subscriber number notifying section 1350 in position managing server 1300 acquires a cellular subscriber number of mobile terminal 1500 that position managing server 1300 holds, and transmits the number to subscriber number transmitting/receiving section 1230 in call control server 1200 (step 1209).

Thus, when mobile terminal 1500 cannot establish a wireless link with IP network 1001, the terminal can notify that registration with IP network 1001 has been failed to position managing server 1300 on IP network 1001.

In addition, registration failure information transmitting section 1340 or subscriber number notifying section 1350 in position managing server 1300 may collect a cellular subscriber number and registration failure information as a single message to transmit to call control server 1200.

Position managing server 1300 may hold a cellular subscriber number of mobile terminal 1500 acquired from the address database when address search section 1320 searches for an IP address of mobile terminal 1500, whereby subscriber number notifying section 1350 does not need to search again for the cellular subscriber number of mobile terminal 1500.

When registration failure information receiving section 1220 and subscriber number transmitting/receiving section 1230 in call control server 1200 receive both the registration failure information and the cellular subscriber number of mobile terminal 1500, communication path change inquiring section 1240 is activated.

Communication path change inquiring section 1240 transmits an inquiry message to communication path change receiving section 1120 in communication initiating terminal 1100, where the inquiry message is to obtain a permission to place a call to cellular network 1000 and indicates that the communication path is changed from IP network 1001 to cellular network 1000 to communicate because mobile terminal 1500 cannot use IP network 1001 (step 1210).

Upon receiving the communication path change inquiry from call control server 1200, communication path change receiving section 1120 in communication initiating terminal 1100 starts up response judging section 1130.

Response judging section 1130 determines a permission to change the communication path by considering a bandwidth and communication cost of the communication path, confidentiality, etc. (step 1211).

Communication path change transmitting section 1140 notifies information indicating that the change of the communication path is permitted or not to cellular calling section 1250 in call control server 1200 (step 1212).

Thus, in a session required from communication initiating terminal 1100, it is possible to notify communication initiating terminal 1100 of using the communication path by the narrowband cellular network, instead of using the communication path by the broadband wireless network, and call control server 1200 can obtain a permission to place a call after the communication path is changed corresponding to selection of communication initiating terminal 1100.

In addition, examples of judgment for change of communication path in response judging section 1130 include that a change of communication path is permitted when only speech is sufficient for a medium to use and that a change of communication path is not permitted because the communication cost increases.

Moreover, it is possible to further provide communication initiating terminal 1100 with an inquiry display section which displays inquiry information on a display of communication initiating terminal 1100 to enable a user to select a permission or non-permission when response judging section 1130 determines a permission of change of communication path, and thus, such a function can be added to the terminal 1100 that a user of communication initiating terminal 1100 makes a judgment of permission of change of the communication path.

Cellular calling section 1250 in call control server 1200 performs processing based on information indicating that the change of the communication path is permitted or not from communication initiating terminal 1100. When the information from communication initiating terminal 1100 indicates rejection of the change of the communication path, the section 1250 withdraws the request to call mobile terminal 1500 from communication initiating terminal 1100.

Meanwhile, when the information from communication initiating terminal 1100 indicates permission of the change of the communication path, the section 1250 places a call to cellular network IP telephone gateway 1800 on cellular network 1000 using the cellular subscriber number of mobile terminal 1500 (step 1213).

Subsequently, via cellular network IP telephone gateway 1800, a call connection to establish a session is carried out between call control server 1200 and call control server 1200 on cellular network 1000.

It is considered that at the beginning of communications, communication initiating terminal 1100 initiates a call to mobile terminal 1500 to perform communications with a large capacity of images and speeches, on the assumption that the terminal 1100 uses a broadband wireless network as a communication path. However, when mobile terminal 1500 cannot establish a wireless link with IP network 1001, since the communication path is changed from broadband IP network 1001 to narrowband cellular network 1000, it is not possible to perform communications with a large capacity of images and speeches.

For example, when mobile terminal 1500 can communicate only speeches, capacity information included in the SIP message is exchanged in the call connection between call control server 1200 and the call control server on cellular network 1000, whereby communications between communication initiating terminal 1100 and mobile terminal 1500 are carried out using speeches that are encoded using an encryption rule usable both in communication initiating terminal 1100 and mobile terminal 1500. In addition, the capability information is described according to a protocol such as SDP.

AS described above, according to the fifth embodiment, even when mobile terminal 1500 cannot establish a wireless link with IP network 1001, call control server 1200 is capable of acquiring a cellular subscriber number of mobile terminal 1500 from position managing server 1300, and it is thus possible to place a call to mobile terminal 1500 via cellular network 1000 to communicate.

Further, according to the fifth embodiment, position managing server 1300 is capable of receiving information indicating that mobile terminal 1500 has failed to establish the wireless link with IP network 1001. Then, position managing server 1300 is capable of notifying call control server 1200 of the cellular subscriber number. In this way, call control server 1200 is capable of placing a call to mobile terminal 1500 via cellular network 1000.

Furthermore, according to the fifth embodiment, it is possible to notify the communication initiating terminal of using the communication path by narrowband cellular network, instead of using the communication path by broadband cellular network, and to receive call permission after the communication path is changed corresponding to selection of the communication initiating terminal.

Figure 13:
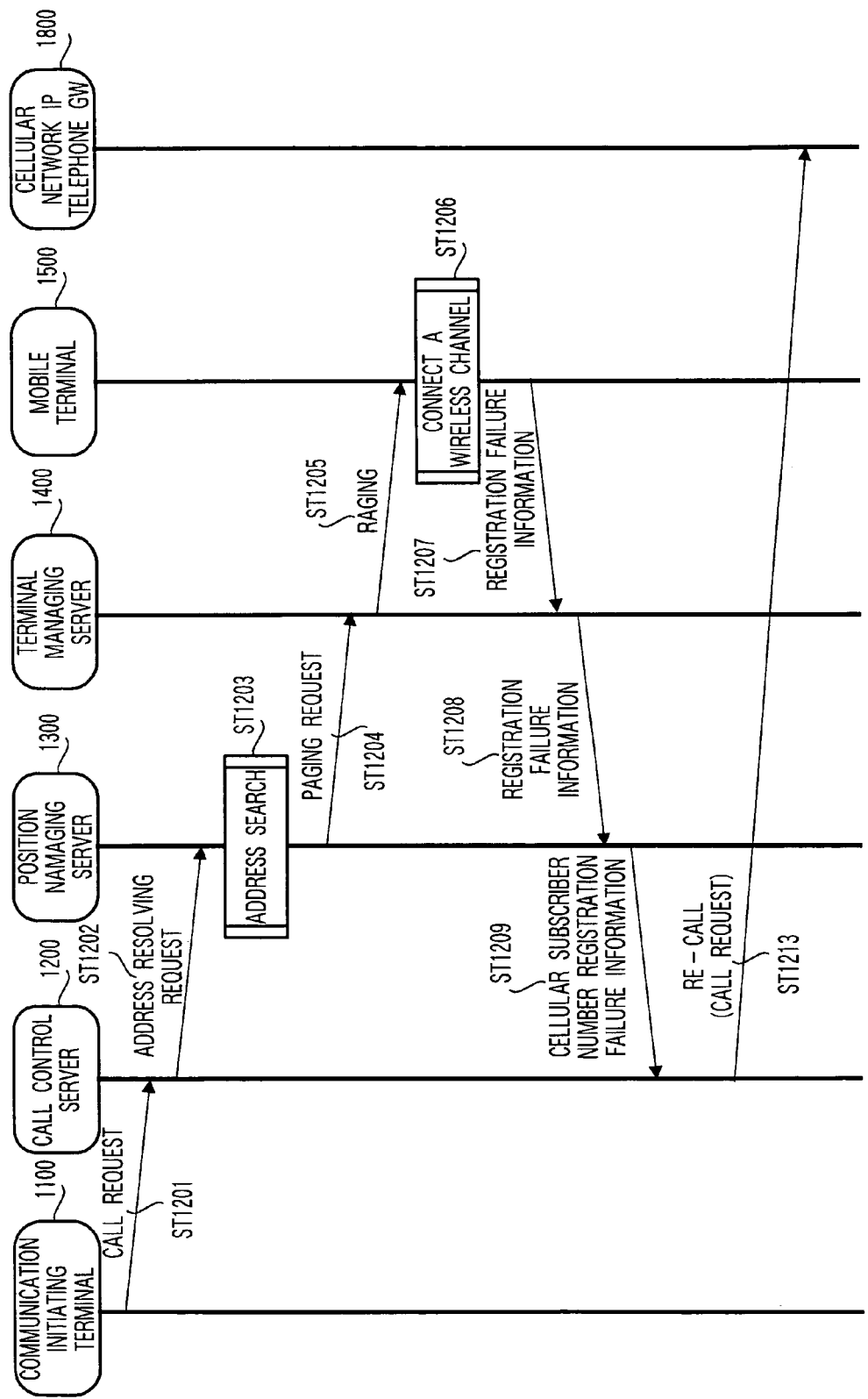
FIG. 13 is an operation sequence diagram of the mobile communication system in the case of omitting procedures for inquiring about a change of communication path according to the fifth embodiment.

In addition, procedures for enabling communication initiating terminal 110 to select a change of communication path in steps 1210 to 1212 are of one aspect, and may be omitted as in another aspect as shown in FIG. 13. FIG. 13 shows another example of fifth embodiment where such procedures are omitted that inquire about a change of communication path at communication initiating terminal 1100.

Such a case can be implemented by providing call control server 1200 with response judging section 1130 that is provided in communication initiating terminal 1100.

Further, it may be possible to prepare a program of the operation performed by each processing section in mobile terminal 1500, position managing server 1300, terminal managing server 1400, call control server 1200, and communication initiating terminal 1100 to store in a storage medium and make a general computer execute the program.

This application is based on the Japanese Patent Applications No. 2002-242390 filed on Aug. 22, 2002, No. 2003-040831 filed on Feb. 19, 2003, and No. 2003-185494 filed on Jun. 27, 2003, entire contents of which are expressly incorporated by reference herein.

INDUSTRIAL APPLICABILITY

As described above, according to the present invention, in a wireless system using a wireless method without the function of paging a mobile terminal, it is possible to paging processing on the mobile terminal to start communications.

Further, even when it is not possible to use a wireless system using a wireless method without the function of paging a communication terminal, it is possible to start communications with the mobile terminal via a cellular network.

The invention claimed is:

1. A call control server which is disposed on a wireless network using a wireless system without a paging function and establishes a session with a mobile terminal, in response to a call request from a communication initiating terminal to communicate with the mobile terminal that performs communications using the wireless network and a cellular network, said call control server comprising:

an address resolving section that inquires about position information of the mobile terminal at a position information managing server that manages the position information of the mobile terminal, in response to a call request transmitted from the communication initiating terminal to initiate a session with the mobile terminal;

a subscriber number receiver that receives a cellular subscriber number of the mobile terminal when the call control server receives registration failure information indicating that the mobile terminal has failed to establish a wireless link with the wireless network transmitted from the mobile terminal; and a cellular caller that requests to initiate a session to the cellular network based on the cellular subscriber number.

2. The call control server according to claim 1, further comprising:

a communication path change inquirer that notifies the communication initiating terminal that the mobile terminal performs communications via the cellular network, instead of using the wireless network, and inquires about permission for the use of the cellular network; and a communication path change response receiver that receives a response transmitted from the communication initiating terminal in response to the inquiry.

3. A session initiation request method in a call control server which is disposed on a wireless network using a wireless system without a paging function and establishes a session with a mobile terminal, in response to a call request from a communication initiating terminal to communicate with the mobile terminal that performs communications using the wireless network and a cellular network, said session initiation request method comprising:

inquiring about position information of the mobile terminal at a position information managing server that manages the position information of the mobile terminal, in response to a call request transmitted from the communication initiating terminal to initiate a session with the mobile terminal;

receiving a cellular subscriber number of the mobile terminal, upon receiving registration failure information indicating that the mobile terminal has failed to establish a wireless link with the wireless network transmitted from the mobile terminal; and requesting to initiate a session to the cellular network based on the cellular subscriber number.

4. A terminal managing server comprising:
a paging processor that pages a mobile terminal that performs communications using a cellular network having a paging function and a wireless network using a wireless system without a paging function, upon receiving a request to page the mobile terminal from a position managing server that is present in the wireless network;
a position information receiver that receives position information transmitted via the cellular network from the mobile terminal which is paged and acquires the position information on the wireless network;
a position information notifying section that notifies the position managing server of the position information received;
a cellular position information assigner that assigns cellular position information on the cellular network to the mobile terminal, when the mobile terminal fails to acquire position information on the wireless network; and
a position information notifying section that notifies the position managing server of the cellular position information acquired.

5. The terminal managing server according to claim 4, further comprising:
a registration failure information receiver that receives registration failure information transmitted from the mobile terminal when the mobile terminal fails to establish a wireless link with the wireless network; and
a registration failure information notifying section that notifies the position managing server of the registration failure information.

6. A mobile terminal comprising:
a paging receiver that receives a paging request transmitted from a paging processor on a cellular network which has a paging function;
a wireless connector that, when the paging request is received, connects a wireless channel with a wireless network using a wireless system which lacks a paging function;
a position information acquirer that requests an assignment of position information to the wireless network using the wireless channel to acquire;
a position information notifying section that notifies the position information acquired to a position managing server on the wireless network; and
a cellular position information acquirer that requests an assignment of position information on the cellular network to the cellular network to acquire, when the terminal fails to acquire position information on the wireless network using the wireless system without the paging function.

7. The mobile terminal according to claim 6, wherein the mobile terminal notifies the position information to the position managing server via the wireless network.

8. The mobile terminal according to claim 6, wherein the mobile terminal notifies the position information to the position managing server the cellular network.

9. The mobile terminal according to claim 6, further comprising a user notifying section that notifies a user of a fact that the paging request is received, when the terminal receives the paging request from the cellular network and fails to acquire position information on the wireless network.

10. The mobile terminal according to claim 6, further comprising a registration failure information transmitter that transmits registration failure information to the terminal managing server when the wireless connector fails to establish a wireless link with the wireless network.

* * * * *